(12) United States Patent
Nora

(10) Patent No.: US 9,214,866 B2
(45) Date of Patent: Dec. 15, 2015

(54) CURRENT SHARING METHOD FOR COT BUCK CONVERTER

(71) Applicant: Micrel, Inc., San Jose, CA (US)

(72) Inventor: Paolo Nora, Belgioioso (IT)

(73) Assignee: Micrel, Inc., San Jose, CA (US)

( * ) Notice: Subject to any disclaimer, the term of this patent is extended or adjusted under 35 U.S.C. 154(b) by 396 days.

(21) Appl. No.: 13/924,202

(22) Filed: Jun. 21, 2013

(65) Prior Publication Data
US 2014/0375288 A1 Dec. 25, 2014

(51) Int. Cl.
*H02M 3/158* (2006.01)
*H02J 1/10* (2006.01)
*H02M 1/00* (2007.01)

(52) U.S. Cl.
CPC ............. *H02M 3/1584* (2013.01); *H02J 1/102* (2013.01); *H02J 2001/106* (2013.01); *H02M 2001/0009* (2013.01); *H02M 2003/1586* (2013.01)

(58) Field of Classification Search
CPC .................. H02M 3/1584; H02M 2003/1557; H02M 3/158; H02M 2003/1586; H02M 2001/0009; H02M 3/156; H02M 1/14; H02M 1/143; H02M 1/15; H02J 1/102; H02J 2001/106
See application file for complete search history.

(56) References Cited

U.S. PATENT DOCUMENTS

| | | | |
|---|---|---|---|
| 6,414,469 B1 | 7/2002 | Zhou et al. | |
| 6,515,457 B1 | 2/2003 | Maniktala | |
| 6,803,750 B2 | 10/2004 | Zhang | |
| 7,107,468 B2 | 9/2006 | Pullen et al. | |
| 7,301,314 B2 | 11/2007 | Schuellein et al. | |
| 8,207,711 B2 | 6/2012 | Crawford et al. | |
| 2002/0125869 A1* | 9/2002 | Groom | H02M 3/1584 323/283 |
| 2005/0001597 A1* | 1/2005 | Walters | H02J 1/102 323/222 |
| 2005/0010825 A1* | 1/2005 | Pullen | H02M 3/1584 713/300 |
| 2007/0139023 A1* | 6/2007 | Hasegawa | H02M 3/158 323/271 |
| 2012/0038334 A1* | 2/2012 | Peng | H02M 3/1588 323/282 |
| 2012/0146609 A1* | 6/2012 | Seki | H02M 3/156 323/284 |
| 2013/0057239 A1 | 3/2013 | Kalje et al. | |
| 2013/0069611 A1* | 3/2013 | Menegoli | H02M 3/1584 323/284 |
| 2014/0132232 A1* | 5/2014 | MacLean | G05F 1/62 323/271 |
| 2014/0253064 A1* | 9/2014 | Swanson | H02M 3/1584 323/272 |

OTHER PUBLICATIONS

TPS51727 Data Sheet, "Dual-Phase, Eco-Mode™ Step-Down Power Management IC for 50-A+ Applications", Jan. 2009, Texas Instruments Incorporated.
Zambetti et al., "Multiphase Buck Controller Based on Voltage Controlled Constant on Time Architecture", May 2012, ISBN 978-3-8007-3431-3, pp. 84-91.

* cited by examiner

*Primary Examiner* — Fred E Finch, III
*Assistant Examiner* — Gustavo Rosario Benitez
(74) *Attorney, Agent, or Firm* — Van Pelt, Yi & James LLP

(57) ABSTRACT

A power system for providing an output current at a regulated system output voltage includes a first power stage and a second power stage, each being a constant on-time (COT) controlled power converter. The first and second power stages generate respective first and second regulated output voltage having reduced or very small output ripple at a common output voltage node. The first and second power stages each includes a ripple injection circuit to inject a ripple signal to the feedback control circuit in each power stage. The power system further includes a current sharing control circuit configured to measure a first output current of the first power stage and a second output current of the second power stage, and to generate a control signal to modulate the feedback control circuit of the second power stage to force the second output current to equal to the first output current.

19 Claims, 3 Drawing Sheets

CURRENT SHARING METHOD FOR COT BUCK CONVERTER

BACKGROUND OF THE INVENTION

Switch mode power supplies or switching regulators, also referred to as DC to DC converters, are often used to convert an input supply voltage to an output voltage at a voltage level appropriate for the internal circuitry of an integrated circuit. For example, a 5 volts supply voltage provided to an integrated circuit may need to be reduced to 2.8 volts on the IC chip to operate the internal circuitry on the chip. A switching regulator provides power supply function through low loss components such as capacitors, inductors, and transformers, and power switches that are turned on and off to transfer energy from the input to the output in discrete packets. A feedback control circuit is used to regulate the energy transfer to maintain a constant output voltage within the desired load limits of the circuit.

A switching regulator can be configured to step up the input voltage or step down the input voltage or both. Specifically, a buck switching regulator, also called a "buck converter," steps down the input voltage while a boost switching regulator, also called a "boost converter," steps up the input voltage. A buck-boost switching regulator, or buck-boost converter, provides both step-up and step-down functions.

The operation of the conventional buck switching regulator is well known and is generalized as follows. A conventional buck switching regulator includes a pair of power switches which are turned on and off to regulate an output voltage to be equal to a reference voltage. More specifically, the power switches are alternately turned on and off to generate a switching output voltage at a switching output node, also referred to as the switch node. The switch node is coupled to an LC filter circuit including an output inductor and an output capacitor to generate an output voltage having substantially constant magnitude. The output voltage can then be used to drive a load.

More specifically, the pair of power switches is often referred to as including a "high-side power switch" and a "low-side power switch." The high-side power switch is turned on to apply energy to the output inductor of the output filter circuit to allow the current through the inductor to build up. When the high-side power switch is turned off, the voltage across the inductor reverses and the current through the inductor reduces during this period. As a result, the inductor current ripples above and below the nominal output current. A relatively constant output voltage is maintained by the output capacitor. The low-side power switch is turned on and off for synchronous control operation.

FIG. 1 is a schematic diagram of a conventional buck switching regulator. Referring to FIG. 1, a switching regulator 1 includes a pair of power switches S1 and S2 configured to receive an input voltage $V_{IN}$ and are alternately turned on and off to generate a switching output voltage $V_{SW}$ at a switch node (SW) 22. The switching output voltage $V_{SW}$ is directly coupled to an LC filter circuit including an output inductor L1 and an output capacitor $C_{OUT}$ to generate a regulated output voltage $V_{OUT}$ at a node 26 having a substantially constant magnitude. The output voltage $V_{OUT}$ can then be used to drive a load 30 whereby switching regulator 1 provides the load current $I_{LOAD}$ to maintain the output voltage $V_{OUT}$ at a constant level.

Switching regulator 1 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In the present embodiment, a voltage divider including resistors R1 and R2 is used to divide down the output voltage $V_{OUT}$ which is then fed back to the switching regulator 1 as a feedback voltage $V_{FB}$ on a feedback node 28. The feedback voltage $V_{FB}$ is compared with the reference voltage $V_{REF}$ at an error processing circuit, such as an error comparator 12. The comparator output is coupled to a controller and gate drive circuit 14 to generate control voltages for the power switches based on a switching regulator control scheme. The control voltages are used to generate gate drive signals for the power switches S1 and S2.

Buck switching regulators or "buck regulators" with fixed on-time control are widely used in the industry for some important advantages as fast load transient response and easy control of a relatively large off-time and a very small fixed on-time to regulate a high input voltage to a low output voltage. Fixed on-time (or constant on-time) regulators are one type of voltage regulators employing ripple-mode control where the output voltage is regulated based on the ripple component in the output signal. Because of the switching action at the power switches, all switch-mode regulators generate an output ripple current through the switched output inductor. This current ripple manifests itself as an output voltage ripple due, principally, to the equivalent series resistance (ESR) in the output capacitor $C_{OUT}$ placed in parallel with the load. The ESR of the output capacitor $C_{OUT}$ is denoted as a resistor $R_{ESR}$ in FIG. 1.

Recently, power systems including multiple power stages are used in applications that demand high output currents. Typically, these power systems operate under multi-phase control. For example, conventional multi-phase converters use a multi-phase PWM controller to generate clock signals with different phase shifts for each phase of the power stages. Control circuits for multi-phase converters are generally more complex and costly in implementation than their single-phase counterparts.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; and/or a composition of matter. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a power system includes two or more constant on-time (COT) controlled power stages connected in parallel with the power stages operating asynchronously. In particular, each power stage implements sufficient output ripple attenuation and uses ripple self-injection for regulation. As thus constructed, the switching pattern of each power stage can run autonomously while each power stage supplies load current to maintain the desired regulated output voltage at a common output voltage node. In embodiments of the present invention, the power system implements a master-slave current sharing control scheme to realize effective average current sharing among the power stages. The master-slave current sharing control scheme operates to force equal currents to flow in the inductors of the master and slave power stages. Meanwhile, the voltage regulation target value is established and controlled by the master power stage.

The power system of the present invention provides many advantages over conventional power system. First, the power system with multiple power stages is able to support higher load current than that allowed by a single power stage. Second, for a given load current level, using two or more power stages instead of just one power stage improves load transient response, enables inductor size reduction and increase ease of power dissipation.

Figure 1:
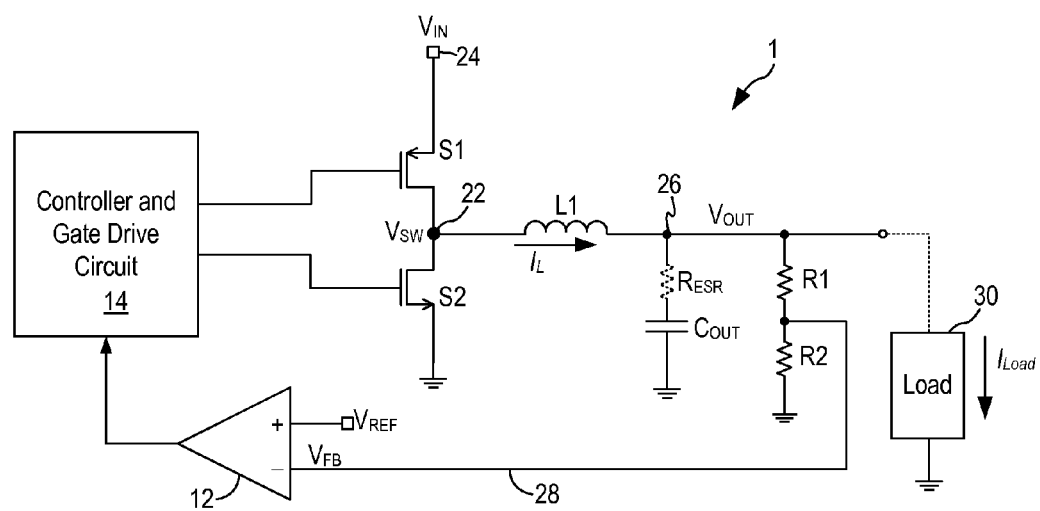
FIG. 1 is a schematic diagram of a conventional buck switching regulator.
Figure 2:
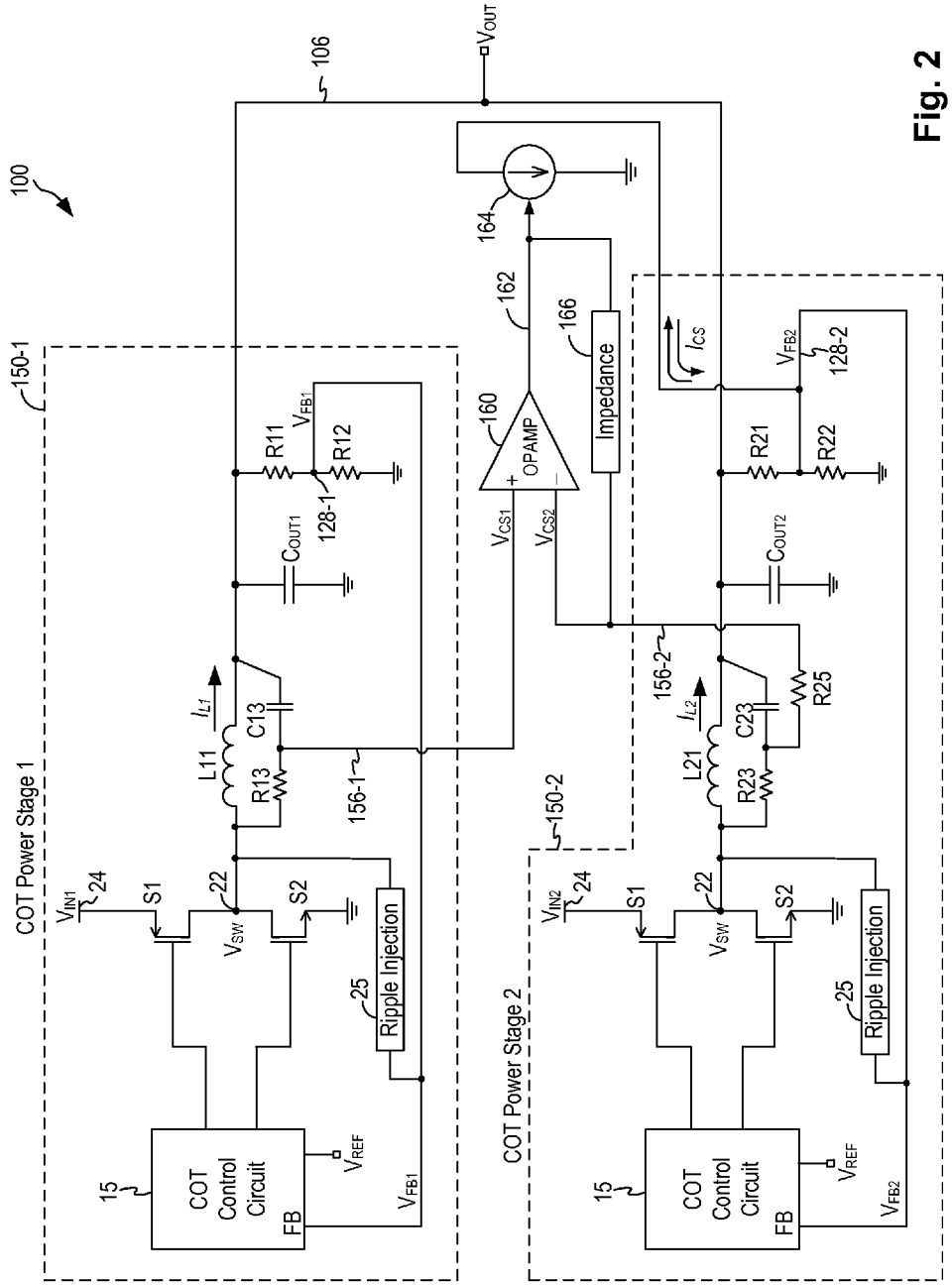
FIG. 2 is a schematic diagram of a power system including two COT power stages according to embodiments of the present invention.

FIG. 2 is a schematic diagram of a power system including two COT power stages according to embodiments of the present invention. Referring to FIG. 2, a power system 100 includes a first COT power stage 150-1 ("COT power stage 1") and a second COT power stage 150-2 ("COT power stage 2") connected in parallel, that is, the output voltage nodes of the two power stages are connected together to a common output voltage node 106. In the present embodiment, the COT power stages are configured as constant on-time controlled buck converters. Each power stage receives an input voltage $V_{IN}$ (node 24) and generates an output voltage $V_{OUT}$ (node 106) that is less than the input voltage. In the present illustration, COT power stage 1 receives an input voltage $V_{IN1}$ and COT power stage 2 receives an input voltage $V_{in2}$. In some embodiments, input voltages $V_{IN1}$ and $V_{IN2}$ are the same voltage value and are supplied from the same voltage source. In other embodiments, input voltages $V_{IN1}$ and $V_{IN2}$ can be different voltage values and supplied from separate voltage sources. The output voltage nodes of the COT power stages 1 and 2 are connected together to generate a regulated output voltage $V_{OUT}$ at the common output voltage node 106 having a substantially constant magnitude within certain load current limit.

In the present description, a "power stage" refers to circuitry of a switching regulator performing the power switching function and generally includes at least the power switches of the switching regulator. In the present description, a "power stage" refers to elements of the switching regulator including the power switches, the gate drivers, the inductor and the control circuit. Furthermore, in some embodiments, a power stage may also include the output capacitor where the inductor and the output capacitor form an output filter circuit and may further include the voltage divider, if any, for generating the feedback voltage for the feedback control. These elements may or may not be formed on a single integrated circuit. For instance, the control circuit, the gate drivers, the power switches may be formed on an integrated circuit while the inductor and the capacitor are discrete components. In other embodiments, the power switches may be discrete transistors. In some embodiments, the elements of the power stage are co-packaged into a single integrated circuit package. The exact level of integration of the elements of the power stage is not critical to the practice of the present invention.

In the present embodiment, the power stages 150-1 and 150-2 have similar constructions, with the same or different element size or element values. The construction of COT power stage 1 will be described below and it is understood that the description is applicable to COT power stage 2. In the present embodiment, the COT power stage 1 includes a pair of power switches S1 and S2 configured to receive an input voltage $V_{IN1}$ and are alternately turned on and off to generate a switching output voltage $V_{SW}$ at a switch node (SW) 22. The switching output voltage $V_{SW}$ is directly coupled to an LC filter circuit including an output inductor L11 and an output capacitor $C_{OUT1}$ to generate the regulated output voltage $V_{OUT}$ at the common output node 106 having a substantially constant magnitude. In the present illustration, power switches S1 and S2 are MOS transistors. Furthermore, in the present illustration, power switch S1 is a PMOS transistor while power switch S2 is an NMOS transistor. In other embodiments, power switch S1 can be implemented using NMOS transistor with the appropriate change in the polarity of the gate drive signal. The exact implementation of the power switches S1 and S2 is not critical to the practice of the present invention.

The COT power stage 1 includes a feedback control circuit to regulate the energy transfer to the LC filter circuit to maintain the constant output voltage within the desired load limits of the circuit. More specifically, the feedback control circuit causes power switches S1 and S2 to turn on and off to regulate the output voltage $V_{OUT}$ to be equal to a reference voltage $V_{REF}$ or to a voltage value related to the reference voltage $V_{REF}$. In the present embodiment, a voltage divider including resistors R11 and R12 is used to divide down the output voltage $V_{OUT}$ which is then fed back to a COT control circuit 15 as a feedback voltage $V_{FB}$ on a feedback (FB) node 128-1. At the COT control circuit 15, the feedback voltage $V_{FB}$ is compared with the reference voltage $V_{REF}$, such as using an error comparator. The comparator output is used to generate control voltages for the power switches based on a constant on-time control scheme. The control voltages are used to generate gate drive signals for the power switches S1 and S2. The control circuit 15 may include gate driver circuits which receive the gate drive signals and generate gate drive voltages appropriate for turning on and off the respective power switches.

In embodiments of the present invention, the power stages 150-1 and 150-2 implement constant on-time feedback control where the switching action is based on the ripple component in the feedback voltage signal. In operation, a constant on-time (or fixed on-time) regulator switches the output inductor high for a fixed on-time (Ton) when the feedback ripple falls below a single reference point $V_{REF}$. At the end of the fixed on-time, the output inductor is switched low, or not energized, until the feedback signal falls again below the reference point $V_{REF}$. At this point a new fixed on-time is initiated. If the feedback signal is still below the single reference point, the output inductor is switched low only for a minimum off-time before getting switched back high for the fixed on-time again.

In some applications, COT control scheme is preferred over clocked PWM control scheme because of fast load transient response. However, COT controlled buck converter relies on the ripple component in the feedback voltage signal to generate an appropriate switching action and to maintain regulation of the output voltage. Thus, it is typically very difficult to achieve stable parallel operation of two COT controlled power stages. In particular, the ripple signal on the output voltage of one power stage would interfere with the ripple signal generated by the other power stage, creating a chaotic switching pattern. Operating parallel COT power stages using multi-phase control has been suggested. The multi-phase control scheme attempts to synchronize the on-time of the different power stages by shifting the phase of the on-time pulses for each power stage by means of a common timing control block. However, external synchronization of the COT controlled power stages without a dedicated common timing control circuit for all power stages is often very complex and attempts to synchronize COT controlled buck converters may result in injection of synchronization signals into the feedback signal, introducing undesired offset or undesired behavior of the output voltage.

In embodiments of the present invention, the power system 100 implements output ripple attenuation and ripple self-injection to enable two COT power stages to be connected in parallel without the need to synchronize the power stages or alternating the phase of the COT control signals by means of a common timing control circuit. More specifically, the power system 100 of the present invention does not rely on phase alternating circuit and there is no need to synchronize the two power stages, as such synchronization would be very difficult for COT controlled power converters anyway. Instead, each power stage runs autonomously to supply the output current to the common output voltage node 106. A salient feature of the power system of the present invention is the use of sufficient output voltage ripple attenuation to reduce or eliminate interference at the feedback node of each power stage and the use of ripple self-injection for generation of the switching action at each power stage for output regulation. In some embodiments, each COT power stage 150-1, 150-2 generates an output voltage having reduced or very small output ripple components. For example, the output ripple at the output voltage of each COT power stage may be on the order of a few milli-volts peak-to-peak. In one embodiment, the COT power stage uses a very low ESR (equivalent series resistance) capacitor as the output capacitor $C_{OUT}$. When two parallely connected COT power stages generate output voltages having very small output ripple components, the output voltage ripple contribution seen at the feedback node of each power stage is nearly invisible in comparison to the amount of ripple that is being self-injected. Accordingly, there is little or no interference in the switching pattern among the different power stages. Therefore, the COT power stages in the power system 100 can run autonomously without the need to synchronize the COT control signals.

However, a COT controlled power converter always requires a ripple signal in the feedback control loop to generate a stable switching pattern and to properly regulate the output voltage. In embodiments of the present invention, each COT power stage implements ripple self-injection to inject a ripple signal in the feedback loop of each power stage. In this manner, regulation of the output voltage at each power stage is achieved with each power stage running on its own injected ripple signal. Referring to FIG. 2, COT power stage 1 includes a ripple injection circuit 25 coupled to the switch node 22 and injects a ripple signal to the feedback node 128-1 for feedback regulation. COT power stage 2 includes a ripple injection circuit as well to inject a ripple signal to the feedback node 128-2. Ripple injection circuit 25 can be constructed in many ways and typically include resistor and capacitor elements. U.S. Pat. Nos. 7,482,791 and 7,482,793 illustrate examples of ripple injection circuits that can be applied in buck regulators using fixed on-time control.

With two COT power stages connected in parallel, power system 100 achieves current sharing between the two power stages through the use of a master-slave current sharing control loop. More specifically, in system 100, output voltage regulation is dictated by the master power stage. In steady state operation, the slave power stage acts as a current source. Through the master-slave current sharing control loop, the output current of the master power stage is detected and fed to the slave power stage in such a way that the slave power stage would provide the same amount of output current that the master power stage is delivering. With effective current sharing, the power stages in system 100 can be operated as autonomous units with each power stage supplying equal output current to the output voltage node 106 to maintain the output voltage. In the present embodiment, power system 100 achieves average current sharing with each power stage providing the same or about the same output current to the load.

In the present embodiment, the master-slave current sharing control loop (or "current sharing control circuit") is implemented using an operational amplifier (op-amp) 160 and a controlled current source 164. The op-amp 160 detects the inductor current in the master power stage (COT power stage 1) and controls the controlled current source 164 to generate a correction signal to force the inductor current in the slave power stage (COT power stage 2) to be equal to the master power stage's inductor current. By forcing the inductor current of the two power stages to be equal, the output current of the power stages also become equal. The current sharing control circuit acts on the feedback loop of the slave power stage. In the present embodiment, the current sharing control circuit generates a correction signal to modulate the feedback voltage signal of the slave power stage (feedback voltage $V_{FB2}$). In other embodiments, the current sharing control circuit can act on other signals in the feedback loop of the slave power stage. For example, the current sharing control circuit can act on the output signal of the error amplifier or error comparator of the feedback control loop of the slave power stage.

More specifically, op-amp 160 has a positive input terminal (node 156-1) receiving a signal indicative of the inductor current $I_{L1}$ of the master power stage 150-1. In the present embodiment, the inductor current is measured using current sensing across the DCR (DC resistance) of inductor L11 by means of a first RC network of resistor R13 and capacitor C13. The op-amp 160 has a negative input terminal (node 156-2) receiving a signal indicative of the inductor current $I_{L2}$ of the slave power stage 150-2. In the present embodiment, the inductor current is also measured using current sensing across the DCR (DC resistance) of inductor L21 by means of a second RC network of resistor R23 and capacitor C23.

Op-amp 160 is configured in a negative feedback loop to force the two signals at the positive and negative input terminals to be equal. To that end, the output signal (node 162) of the op-amp 160 is coupled to drive a bi-directional controlled current source 164 which is capable of pushing or pulling current $I_{CS}$ into or out of the feedback node 128-2 of the slave power stage 150-2. The current $I_{CS}$ being introduced to the slave feedback node 128-2 is the correction signal to adjust the output current of the slave power stage 150-2 to cause the slave power stage to provide the same output current as the master power stage 150-1. An impedance 166 is coupled between the output node 162 of the op-amp 160 and the negative input terminal 156-2 to provide frequency compensation of the master-slave current sharing loop. The impedance 166 typically includes resistive or capacitive elements. A resistor R25 is coupled between the second RC network (R23-C23) and the negative input terminal 156-2 of the op-amp 160, in order to determine the gain of the frequency compensation. It is instructive to note that the master-slave current sharing control loop operates on the slave power stage only to force the slave power stage inductor current to be the same as the inductor current of the master power stage. The master-slave current sharing control loop is open loop for the master power stage and therefore the master power stage can still operate with fast transient response.

In the present embodiment, current sensing at the master and slave power stages is implemented using inductor DCR current sensing. In other embodiments, current sensing at the master and slave power stages can be realized using other means, such as current sense resistors.

In the above described embodiment, the power system includes two power stages with one master power stage and one slave power stage. Using two power stages in the power system has the benefits of maintaining symmetry, such as allowing the two power stages to be constructed to maintain balanced return path to ground. In other embodiments, the power system of the present invention can be constructed using three or more power stages with one master power stage and two or more slave power stages. In that case, a differential amplifier may be used to accurately sense the inductor current at each of the power stages and eliminate unwanted voltage drops due to ground returns asymmetries.

In the embodiment shown in FIG. 2, the master-slave current sharing control circuit is implemented using a controlled current source 164 that is capable of generating a correction signal of positive or negative polarity. That is, the controlled current source 164 can push or pull current from the slave feedback node 128-2. In that case, the master and slave COT power stages can be constructed in identical manner, with the use of the same resistance values for the feedback network, that is, resistors R11 and R21 and resistors R12 and R22. As thus constructed, the slave power stage may end up trying to regulate the output voltage $V_{OUT}$ higher or lower than the master power stage.

In alternate embodiments of the present invention, the slave power stage is configured to regulate the target $V_{OUT}$ to a voltage value that is higher or lower than the target $V_{OUT}$ regulated by the master power stage. In that case, the controlled current source can be implemented as a uni-directional current source to either pull current from or sink current into the slave feedback node. The implementation of the controlled current source can thus be simplified.

In one embodiment, the target $V_{OUT}$ regulated by the slave power stage is lower than the target $V_{OUT}$ of the master power stage after taking into consideration of process and operational variations. For example, the resistance values of resistors R21 and R22 may be selected to be different from the resistance values of resistors R11 and R12 to select a lower target $V_{OUT}$ values for the slave power stage. When the slave power stage is regulated to a lower output voltage value, the master-slave current sharing control circuit is implemented to provide a unidirectional correction current that pulls current out of the slave feedback node, which simplifies the design of the controlled current source.

Figure 3:
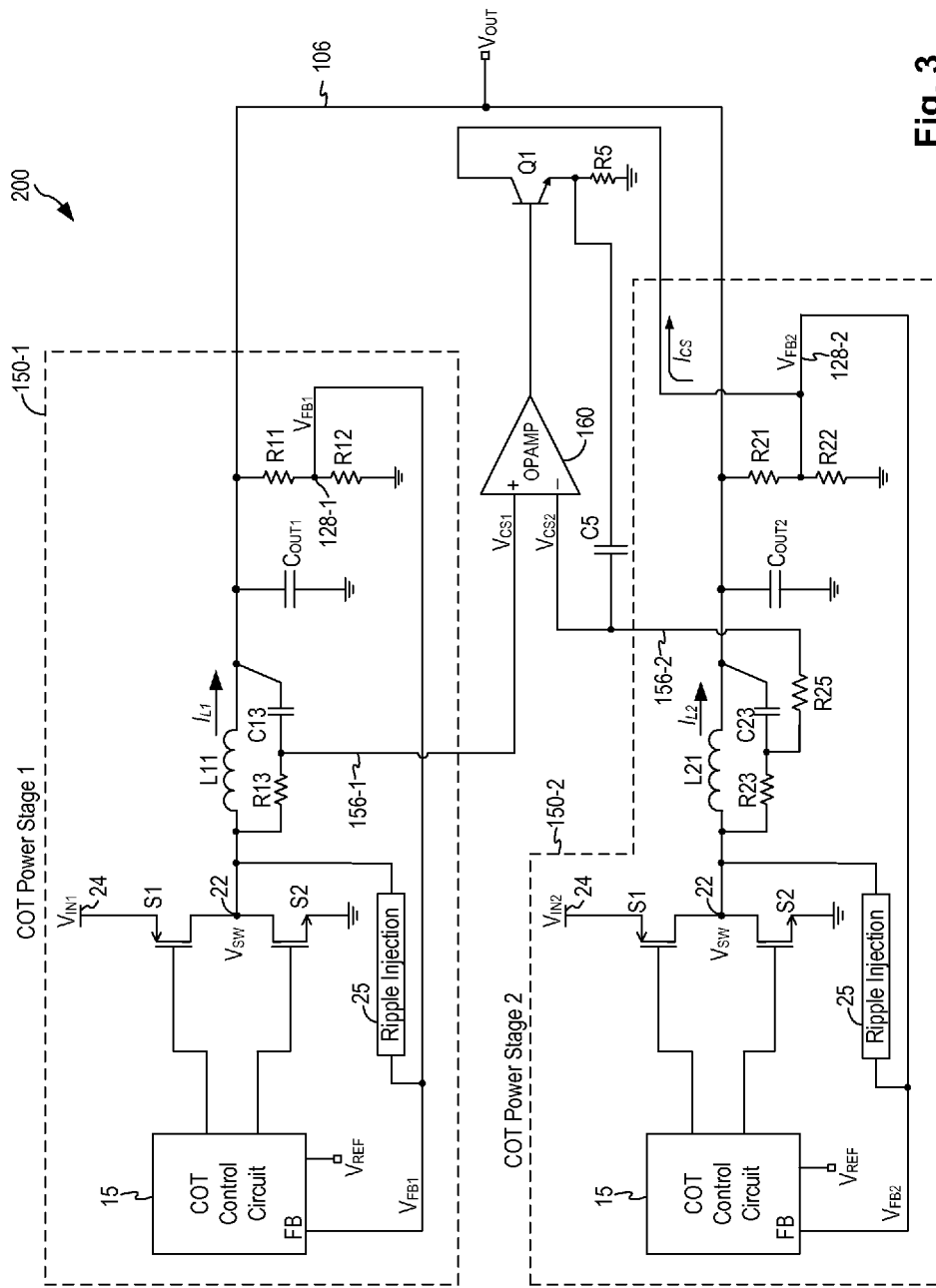
FIG. 3 is a schematic diagram of a power system including two COT power stages according to an alternate embodiment of the present invention.

FIG. 3 is a schematic diagram of a power system including two COT power stages according to an alternate embodiment of the present invention. Like elements in FIGS. 2 and 3 are given like reference numerals and will not be further described. In power system 200 shown in FIG. 3, the slave power stage 150-2 is configured to regulate its target output voltage to a voltage value lower than the target output voltage regulated by the master power stage 150-1. Accordingly, the slave power stage 150-2 has resistor values for feedback resistors R21/R22 that are different from the resistor values for feedback resistors R11/R12 in the master power stage 150-1. The current sharing control circuit only needs to provide a unipolar current signal as the correction signal. More specifically, when the slave power stage 150-2 regulates its output voltage lower than the output voltage of the master power stage 150-1, the correction signal only needs to pull current $I_{CS}$ out of the slave feedback node 128-2.

When the current sharing control circuit only needs to provide a unipolar correction signal to pull current out of the slave feedback node, the controlled current source can be implemented using an NPN bipolar transistor Q1. Referring to FIG. 3, the op-amp 160 is configured to drive the base terminal of NPN bipolar transistor Q1. The emitter terminal of transistor Q1 is connected through a resistor R5 to the ground potential and is also connected back to the negative input terminal (node 156-2) of the op-amp through a capacitor C5 for frequency compensation. The collector terminal of transistor Q1 is connected to the feedback voltage node 128-2 of the slave power stage 150-2. In operation, the resistor R5 at the emitter of the transistor Q1 converts the voltage signal generated by op-amp 160 into a current signal at the collector terminal of transistor Q1. As thus configured, op-amp 160 controls transistor Q1 to sink the correction current $I_{CS}$ out of the slave feedback voltage node 128-2 in order to force the signals at the input terminals of the op-amp to be equal. In this manner, the inductor current of the slave power stage is forced to be the same as the inductor current of the master power stage.

In some applications, sinking current out of the slave feedback voltage node is preferred as the correction signal for slave feedback voltage signal can be generated with respect to ground, so that PSRR (power supply rejection ratio), switching noise and polarity cross-over issues of the correction signal is relieved, make implementation of the master-slave current sharing control loop more simple.

In some embodiments, saturation of the transistor Q1 can be prevented by clamping the voltage swing at the base terminal of the transistor. In this manner, transistor Q1 is ensured to operate at the correct operating point.

In the present embodiment, transistor Q1 is implemented using an NPN bipolar transistor. In other embodiments, transistor Q1 can be implemented using a bipolar transistor or a MOS transistor of either N or P polarity. When PNP bipolar transistor or PMOS transistor is used, the voltage polarities at the transistor are reversed, as is understood by one skilled in the art. In some embodiments, the power system of the present invention can be configured to allow the slave power stage to regulate the target output voltage to a value higher than the target output voltage regulated by the master power stage. This can be accomplished by selection of appropriate resistor values for the feedback resistors R11/R12 and R21/R22. In that case, the master-slave current sharing control circuit can be configured to provide a unipolar correction signal that pushes a correction current into the slave feedback node 128-2 and the current sharing control circuit can be implemented using a PNP bipolar transistor or PMOS transistor for transistor Q1.

Furthermore, in embodiments of the present invention, the power system can be constructed using power stages implemented as other types of ripple-mode controlled power converters where the output voltage is regulated based on the ripple component in the output signal. Constant on-time buck converters are one type of ripple-controlled power converters. In other embodiments, the power stages can be configured as constant off-time buck converters. In operation, a constant off-time regulator switches the output inductor low, or not energized, for a fixed off-time (Toff). After the fixed off-time has expired, the low-side switch is turned off and the high-side switch is turned on until the feedback voltage exceeds the error comparator threshold. In this way, the peak of the ripple waveform is regulated. On the contrary, in constant on-time regulators, the valley of the ripple waveform is regulated. For both, the error comparator threshold can be either a fixed voltage threshold, or the output of an integrating stage for improved line regulation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A power system for providing an output current at a regulated system output voltage, the power system comprising:
   a first power stage comprising a constant on-time (COT) controlled power converter, the first power stage receiving a first input voltage and generates a first regulated output voltage having a substantially constant magnitude at a common output voltage node, the first power stage comprising a first feedback control circuit configured to receive a first feedback voltage indicative of the first regulated output voltage and to regulate the first regulated output voltage based on the first feedback voltage, the first power stage further comprising a first LC filter circuit configured to generate the first regulated output voltage having reduced or very small output ripple and further comprising a first ripple injection circuit configured to inject a ripple signal to a node in the first feedback control circuit;
   a second power stage comprising a constant on-time (COT) controlled power converter, the second power stage receiving a second input voltage and generates a second regulated output voltage having a substantially constant magnitude at the common output voltage node, the second power stage comprising a second feedback control circuit configured to receive a second feedback voltage indicative of the second regulated output voltage and to regulate the second regulated output voltage based on the second feedback voltage, the second power stage further comprising a second LC filter circuit configured to generate the second regulated output voltage having reduced or very small output ripple and further comprising a second ripple injection circuit configured to inject a ripple signal to a node in the second feedback control circuit, the first power stage and the second power stage being coupled to the common voltage node to generate the regulated system output voltage at the common output voltage node; and
   a current sharing control circuit configured to measure a first output current of the first power stage and a second output current of the second power stage, and to generate a control signal to modulate the second feedback control circuit of the second power stage to force the second output current to equal to the first output current, wherein the current sharing control circuit comprises:
      an operational amplifier having a positive input terminal couple to receive the first output current of the first power stage, a negative input terminal coupled to receive the second output current of the second power stage, and an output terminal;
      a controlled current source having a control terminal coupled to the output terminal of the operational amplifier, the controlled current source being connected between a power supply potential and the node in the second feedback control circuit of the second power stage, the control current source being controlled by the operational amplifier to push current into and pull current out of the node in the second feedback control circuit in order to force the second output current to equal to the first output current; and an impedance coupled between the negative input terminal and the output terminal of the operational amplifier.

2. The power system of claim 1, wherein the first LC filter circuit and the second LC filter circuit each comprises an inductor and an output capacitor, the output capacitor comprising a capacitor with very low equivalent series resistance.

3. The power system of claim 1, wherein:
   the first power stage comprising a first switch and a second switch being controlled based on a constant on-time feedback control scheme to drive a first switch output node for generating a first switching output voltage, the first switch output node being coupled to the first LC filter to generate the first regulated output voltage having reduced or no output ripple, the first feedback control circuit of the first power stage being configured to receive a first feedback voltage indicative of the first regulated output voltage and to regulate the first regulated output voltage based on the first feedback voltage,
   wherein the first ripple injection circuit is coupled to the first switching output voltage and is configured to inject the ripple signal to the first feedback voltage.

4. The power system of claim 1, wherein the current sharing control circuit comprises:
   a transistor as the controlled current source, the transistor having a control terminal coupled to the output terminal of the operational amplifier, a first current terminal coupled to a power supply potential and a second current terminal coupled to the node in the second feedback control circuit of the second power stage, the transistor being controlled by the operational amplifier to push current into and pull current out of the node in the second feedback control circuit in order to force the second output current to equal to the first output current; and
   a capacitor as the impedance, the capacitor being coupled between the first current terminal of the transistor and the negative input terminal of the operational amplifier.

5. The power system of claim 4, wherein:
   the second power stage comprising a third switch and a fourth switch being controlled based on a constant on-time feedback control scheme to drive a second switch output node for generating a second switching output voltage, the second switch output node being coupled to the second LC filter to generate the second regulated output voltage having reduced or no output ripple, the second feedback control circuit of the second power stage being configured to receive a second feedback voltage indicative of the second regulated output voltage and to regulate the second regulated output voltage based on the second feedback voltage, wherein the second ripple injection circuit is coupled to the second switching output voltage and is configured to inject the ripple signal to the second feedback voltage; and wherein the second current terminal of the transistor is coupled to the node in the second feedback control circuit of the second power stage to modulate the second feedback voltage, thereby forcing the second output current to equal to the first output current.

6. The power system of claim 4, wherein the transistor comprises an NPN bipolar transistor and the power supply potential comprises a ground potential.

7. The power system of claim 4, wherein the transistor comprises one of a PNP bipolar transistor, a NMOS transistor and a PMOS transistor.

8. The power system of claim 2, wherein the current sharing control circuit is configured to measure an inductor current flowing through the inductor in the first LC filter circuit as the first output current and to measure an inductor current flowing through the inductor in the second LC filter circuit as the second output current.

9. The power system of claim 8, wherein the current sharing control circuit measures the inductor current in respective first or second LC filter circuit by current sensing at the DC resistance of the inductor in the respective LC filter circuit.

10. The power system of claim 8, wherein the current sharing control circuit measures the inductor current in respective first or second LC filter circuit by using a current sense resistor coupled to the inductor in the respective LC filter circuit.

11. The power system of claim 4, wherein the first regulated output voltage is substantially the same as the system output voltage and the second regulated output voltage is less than the first regulated output voltage, the transistor being configured to be controlled by the operational amplifier to pull current out of the node in the second feedback control circuit in order to force the second output current to equal to the first output current.

12. The power system of claim 4, wherein the first regulated output voltage is substantially the same as the system output voltage and the second regulated output voltage is greater than the first regulated output voltage, the transistor being configured to be controlled by the operational amplifier to push current into the node in the second feedback control circuit in order to force the second output current to equal to the first output current.

13. The power system of claim 1, wherein the first input voltage and the second input voltage have the same voltage value.

14. The power system of claim 1, wherein the first input voltage and the second input voltage have different voltage values.

15. The power system of claim 1, wherein the first and second power stages each comprises a constant on-time (COT) controlled buck converter.

16. A method for providing an output current at a regulated system output voltage, the method comprising:
    providing a first power stage and a second power stage, each power stage comprising a constant on-time (COT) controlled power converter;
    connecting output voltage nodes of the first and second power stages to a common output voltage node to generate the regulated system output voltage at the common output voltage node;
    generating a first regulated output voltage at the first power stage having reduced or very small output ripple;
    generating a second regulated output voltage at the second power stage having reduced or very small output ripple;
    injecting a first ripple signal to a first feedback voltage of a first feedback control circuit of the first power stage;
    injecting a second ripple signal to a second feedback voltage of a second feedback control circuit of the second power stage;
    measuring a first output current of the first power stage and a second output current of the second power stage; and
    in response to a measured difference between the first output current and the second output current, generating a control signal to modulate the second feedback voltage of the second feedback control circuit of the second power stage to force the second output current to equal to the first output current while the first power stage and the second power stage provide the first and second output currents, respectively, to the common output voltage node to maintain the regulated system output voltage at a desired voltage level, wherein the control signal is operative to push current into and pull current out of a node in the second feedback control circuit to modulate the second feedback voltage.

17. A power system for providing an output current at a regulated system output voltage, the power system comprising:
    a first power stage comprising a ripple-mode controlled power converter, the first power stage receiving a first input voltage and generates a first regulated output voltage having a substantially constant magnitude at a common output voltage node, the first power stage comprising a first feedback control circuit configured to receive a first feedback voltage indicative of the first regulated output voltage and to regulate the first regulated output voltage based on the first feedback voltage, the first power stage further comprising a first LC filter circuit configured to generate the first regulated output voltage having reduced or very small output ripple and further comprising a first ripple injection circuit configured to inject a ripple signal to a first feedback voltage in the first feedback control circuit;
    a second power stage comprising a ripple-mode controlled power converter, the second power stage receiving a second input voltage and generates a second regulated output voltage having a substantially constant magnitude at the common output voltage node, the second power stage comprising a second feedback control circuit configured to receive a second feedback voltage indicative of the second regulated output voltage and to regulate the second regulated output voltage based on the second feedback voltage, the second power stage further comprising a second LC filter circuit configured to generate the second regulated output voltage having reduced or very small output ripple and further comprising a second ripple injection circuit configured to inject a ripple signal to a second feedback voltage in the second feedback control circuit, the first power stage and the second power stage being coupled to the common voltage node to generate the regulated system output voltage at the common output voltage node; and
    a current sharing control circuit configured to measure a first output current of the first power stage and a second output current of the second power stage, and in response to a measured difference between the first output current and the second output current, to generate a control signal to modulate the second feedback voltage in the second feedback control circuit of the second power stage to force the second output current to equal to the first output current while the first power stage and the second power stage provide the first and second output currents, respectively, to the common output voltage node to maintain the regulated system output voltage at a desired voltage level, wherein the control signal is operative to push current into and pull current out of a node in the second feedback control circuit to modulate the second feedback voltage.

18. The power system of claim 17, wherein the first and second power stages each comprises a constant on-time (COT) controlled buck converter.

19. The power system of claim 17, wherein the first and second power stages each comprises a constant off-time controlled buck converter.

* * * * *